United States Patent
Kelly et al.

(10) Patent No.: US 9,659,441 B2
(45) Date of Patent: *May 23, 2017

(54) OPT-IN PROXIMITY ALERT

(71) Applicant: WMS Gaming, Inc., Waukegan, IL (US)

(72) Inventors: Sean P. Kelly, Skokie, IL (US); Donald E. Brundage, Riverside, MO (US); Venkatesh A. Khanna, Pune (IN)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,163

(22) Filed: Oct. 15, 2014

(65) Prior Publication Data

US 2015/0045115 A1    Feb. 12, 2015

Related U.S. Application Data

(63) Continuation of application No. 13/801,594, filed on Mar. 13, 2013, now Pat. No. 8,894,493.

(Continued)

(51) Int. Cl.
*G07F 17/32* (2006.01)
*A63F 13/00* (2014.01)

(52) U.S. Cl.
CPC ............ *G07F 17/323* (2013.01); *A63F 13/00* (2013.01); *G07F 17/3218* (2013.01); *G07F 17/3237* (2013.01)

(58) Field of Classification Search
CPC . G07F 17/323; G07F 17/3237; G07F 17/3218
See application file for complete search history.

(56) References Cited

U.S. PATENT DOCUMENTS 6,843,725 B2    1/2005  Nelson
6,884,170 B2 *  4/2005  Rowe .............................. 463/31
(Continued)

FOREIGN PATENT DOCUMENTS

WO    2007022256    2/2007
WO    2009120616    10/2009
WO    2011100562    8/2011

OTHER PUBLICATIONS

"U.S. Appl. No. 13/801,594, Office Action", May 14, 2014, 14 Pages.
(Continued)

*Primary Examiner* — Dmitry Suhol
*Assistant Examiner* — David Duffy
(74) *Attorney, Agent, or Firm* — DeLizio Law, PLLC

(57) ABSTRACT

A method for alerting a player about a wagering game machine is described herein. In some embodiments, the method can include receiving, via a communications network from a handheld computing device, player preferences for an opt-in proximity alert. The method can further include creating the opt-in proximity alert based, at least in part, on the player preferences. The method can further include determining, via one or more processors, that the handheld computing device is in proximity to a wagering game machine matching the player preferences. The method can further include causing the handheld computing device to present an alert about the wagering game machine matching the player preferences.

18 Claims, 12 Drawing Sheets

Related U.S. Application Data

(60) Provisional application No. 61/736,809, filed on Dec. 13, 2012.

(56) References Cited

U.S. PATENT DOCUMENTS

| | | | |
|---|---|---|---|
| 6,935,958 B2 | 8/2005 | Nelson | |
| 7,300,352 B2 * | 11/2007 | Rowe | 463/32 |
| 7,330,108 B2 | 2/2008 | Thomas | |
| 7,602,298 B2 | 10/2009 | Thomas | |
| 7,801,736 B1 | 9/2010 | Halbritter et al. | |
| 8,070,582 B2 * | 12/2011 | Lutnick et al. | 463/16 |
| 8,118,669 B2 | 2/2012 | Rader et al. | |
| 8,210,928 B2 | 7/2012 | Walker et al. | |
| 8,226,474 B2 | 7/2012 | Nguyen et al. | |
| 8,574,072 B2 * | 11/2013 | Motyl et al. | 463/31 |
| 8,622,823 B2 * | 1/2014 | Huynh et al. | 463/29 |
| 8,636,575 B2 * | 1/2014 | Lutnick et al. | 463/16 |
| 8,696,470 B2 * | 4/2014 | Nguyen | 463/43 |
| 2003/0045354 A1 | 3/2003 | Giobbi | |
| 2005/0116020 A1 | 6/2005 | Smolucha et al. | |
| 2005/0171808 A1 * | 8/2005 | Saenz et al. | 705/1 |
| 2006/0287078 A1 | 12/2006 | Smolucha et al. | |
| 2008/0085769 A1 * | 4/2008 | Lutnick et al. | 463/41 |
| 2009/0055204 A1 | 2/2009 | Pennington et al. | |
| 2009/0093300 A1 * | 4/2009 | Lutnick et al. | 463/26 |
| 2009/0197684 A1 | 8/2009 | Arezina et al. | |
| 2009/0264190 A1 | 10/2009 | Davis et al. | |
| 2009/0280910 A1 | 11/2009 | Gagner et al. | |
| 2010/0062833 A1 | 3/2010 | Mattice et al. | |
| 2010/0113161 A1 * | 5/2010 | Walker et al. | 463/42 |
| 2010/0323785 A1 * | 12/2010 | Motyl et al. | 463/25 |
| 2011/0045908 A1 | 2/2011 | Ehrlich et al. | |
| 2011/0081961 A1 | 4/2011 | Gagner et al. | |
| 2011/0205068 A1 | 8/2011 | Huynh et al. | |
| 2012/0015735 A1 | 1/2012 | Abouchar et al. | |
| 2012/0184352 A1 | 7/2012 | Detlefsen et al. | |
| 2014/0171206 A1 | 6/2014 | Kelly et al. | |

OTHER PUBLICATIONS

Co-pending U.S. Appl. No. 13/801,594, filed Mar. 13, 2013, 46 pages.

* cited by examiner

OPT-IN PROXIMITY ALERT

RELATED APPLICATIONS

This application is a continuation of U.S. patent application Ser. No. 13/801,594 filed on 13 Mar. 2013, U.S. Pat. No. 8,894,493, which claims the benefit of U.S. Provisional Application Ser. No. 61/736,809 filed 13 Dec. 2012.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to wagering game systems including proximity alerts.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Introduction

This section provides an introduction to some embodiments of the invention.

Wagering game machines come in many varieties. There are both mechanical machines (e.g. slot machines with mechanical reels) and video wagering game machines (slot machines with video reels, video poker machines, etc.). With such a diverse array of wagering game machines, players may develop preferences for different wagering game machine characteristics. For example, a player may prefer mechanical slot machines to video slot machines, or wagering game machines with low minimum bets to high minimum bets, etc. Additionally, players may prefer specific games offered on various wagering game machines. For example, a player may prefer video poker and video blackjack to video slots or video baccarat.

As casinos grow larger and larger, they often house a greater number of games, including both table games and wagering game machines. As such, players may find it difficult to locate games having characteristics that match their preferences. Specifically, many casinos house wagering game machines in rows in dedicated portions of the casino. To facilitate higher play volume, casinos often prefer to utilize machines that catch the attention of the players. Consequently, many casino floors may be packed with a seemingly endless sea of garish wagering game machines. Because of this numerosity, many players may have difficulty locating wagering game machines having characteristics matching their preferences.

Some embodiments of the inventive subject matter assist players in locating wagering game machines having characteristics matching their preferences by alerting players when they are in the vicinity of such games. For example, wagering game machine may wirelessly broadcast (e.g., via Bluetooth) their characteristics for receipt by mobile phones and other mobile devices roaming about the casino. A player's mobile phone may receive and process the gaming machine information, and alert the player about machines matching the player's preferences. The following discussion describes these and other embodiments in more detail.

Proximity Alerts for Wagering Game Machines

Figure 1:
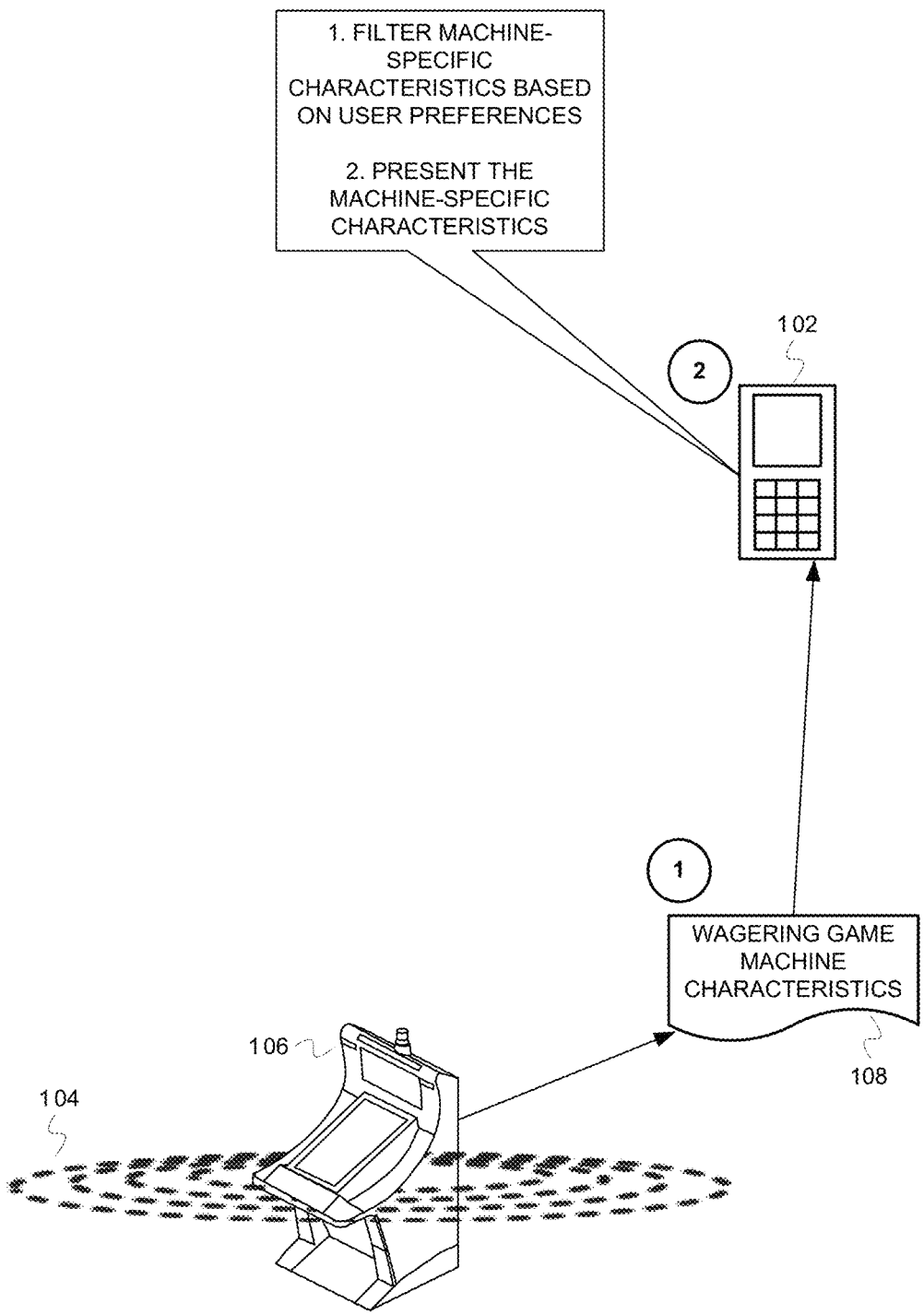
FIG. 1 depicts a sample embodiment of the interaction between a wagering game machine 106 and a handheld computing device 102.

FIG. 1 depicts interactions between a wagering game machine 106 and a handheld computing device 102. The interactions can occur in two stages. During stage 1, the wagering game machine 106 broadcasts (as depicted by 104) information 108 indicating characteristics of the wagering game machine. Such characteristics 108 may include the games offered on the wagering game machine 106, the denomination of the games offered on the wagering game machine 106, recent payout information relating to the games offered on the wagering game machine 106, etc. The handheld computing device 102 receives the information 108 including the machine's characteristics.

During stage 2, the handheld computing device 102 may filter the information 108 provided by the wagering game machine 106. In some instances, the handheld computing device 102 is aware of the player's gaming machine preferences. As such, the handheld computing device can compare the player's preferences with the wagering game machine's 106 characteristics 108. If the handheld computing device 102 determines that the player's preferences match the wagering game machine's 106 characteristics 108, the handheld computing device 102 may alert the player that there is a wagering game machine 106 with characteristics 108 matching the player's preferences in the vicinity.

In other embodiments, instead of the wagering game machine 106 broadcasting its characteristics, the handheld computing device 102 broadcasts the player's preferences for receipt by the wagering game machine 106. The wagering game machine 106 can filter the player's preferences to determine if there is a match. If there is a match, the wagering game machine 106 alerts the handheld computing device 102 that such a match exists and that the handheld computing device 102 is in the vicinity of the wagering game machine 106. In turn, the handheld computing device 102 can present graphical or audible indicia indicating that a matching machine is in close proximity.

In yet other embodiments, a backend system (not shown) may receive (from the handheld computing device 102) the player's preferences, and determine if a matching machine is nearby. In such embodiments, the backend system may compare the player's preferences with the wagering game machine's characteristics to determine if there is a match. If there is a match, the backend system may request that the wagering game machine 106 alert the handheld computing device 102 that such a match exists and that the handheld computing device 102 is in the vicinity of the wagering game machine 106. In other embodiments, the backend system may notify the handheld computing device 102 directly that such a match exists and that the handheld computing device 102 is in the vicinity of the wagering game machine 106.

In some embodiments, alerts may be presented without matching. For example, the wagering game machine 106 may broadcast its presence to a handheld computing device 102. In such embodiments, a handheld computing device 102 may alert a player of the wagering game machine's 106 presence regardless of a match between the wagering game machine's characteristics and the player's preferences. For example, a player may not have player preferences set, and a wagering game machine 106 may alert the handheld computing device 102 of its presence. In some embodiments, the handheld computing device 102 can in turn alert the player of the wagering game machine's 106 presence.

Figure 2:
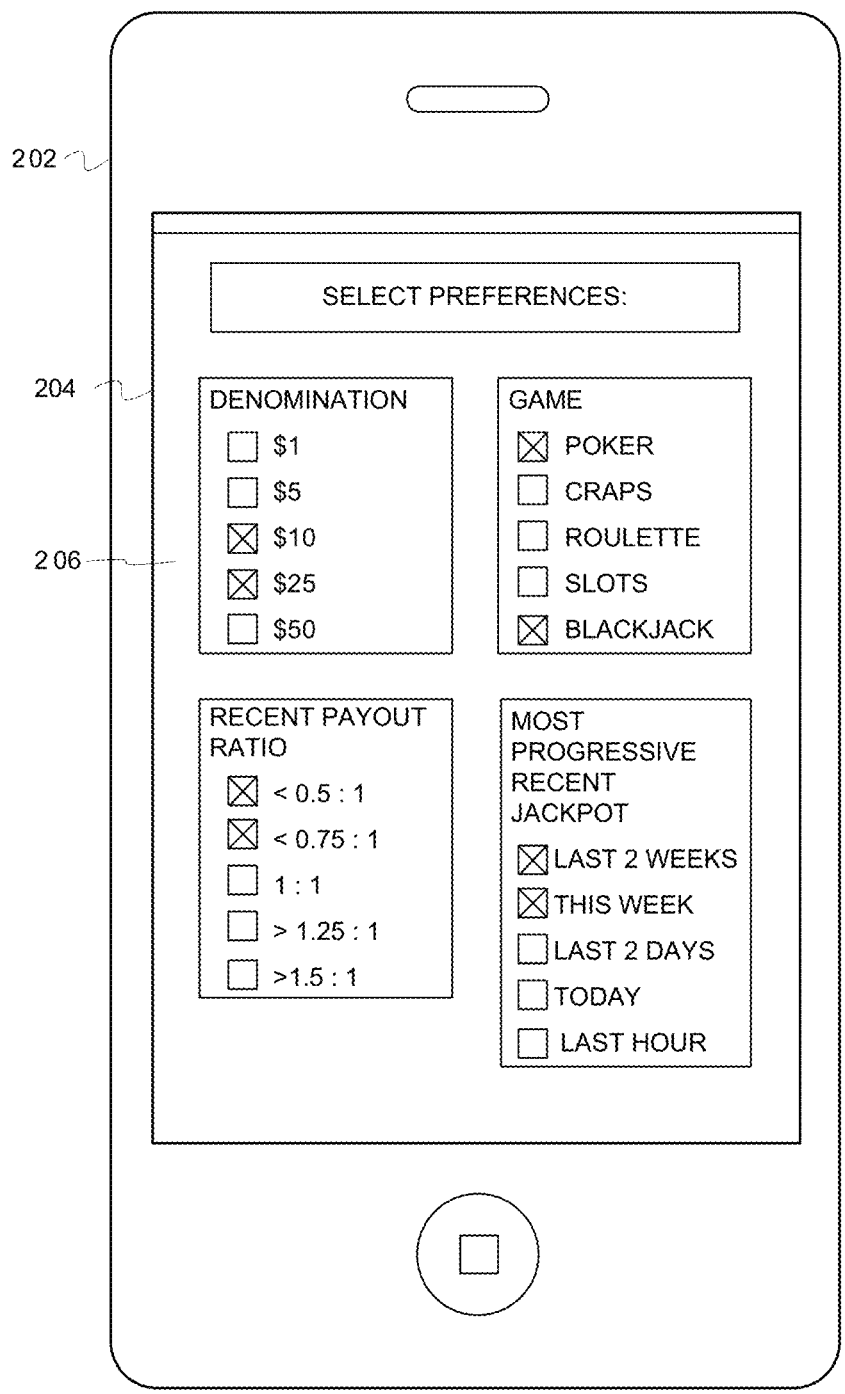
FIG. 2 is a diagrammatic illustration of an interface 204 in which a player may select preferences.

FIG. 2 is a diagrammatic illustration of an interface 204 in which a player may select preferences. FIG. 2 depicts a handheld computing device 202 with which a player may interact to select preferences for wagering game machines. In some embodiments, the handheld computing device 202 may be a mobile phone 202, as shown in FIG. 2. In such embodiments, the handheld computing device 202 may employ a graphical user interface (GUI) 204 through which the user may interact with the handheld computing device 202. The GUI 204 presents a plurality of preferences 206 from which the user may select. As shown, the selectable preferences 206 include denomination, type of game, recent payout ratio, and the interval of time since the most recent jackpot. In FIG. 2, the user has selected preferences 206 for wagering game machines having $10 and $25 denominations, wagering game machines having video poker and video blackjack, wagering game machines having recent payouts of less than 0.75 to 1 and 0.5 to 1, as well as wagering game machines having a most recent jackpot either this week or within the last two weeks.

This depiction however is not exhaustive, as other embodiments may include further preferences 206 from which the user may select, such as the number of games available on a wagering game machine, the ability to play multiple games simultaneously on a wagering game machine, the theme of the wagering game machine, the existence of bonus games on the wagering game machine, etc. The preferences can indicate any aspect of a wagering game machine. Additionally, in some embodiments, the preferences may include a required match percentage for an alert to be presented. For example, a player may select to only be alerted upon a match of 50% of the preferences or higher. In some embodiments, a player may be able to select fields that are required to match to be alerted. For example, a player can select to only be alerted about wagering game machines having video poker. That is, regardless of the other preferences matching, the player will not be alerted unless the wagering game machine offers video poker.

In some embodiments, players may be able to select their preferences at a central terminal. For example, there may be one or more central terminals located around the casino. Players may be able to log in to the central terminals and access a preference menu similar to that depicted in FIG. 2. In some embodiments, after a player enters their preferences at the terminal, the terminal can display a list of matching wagering game machines. In some embodiments, the player can then select a desired wagering game machine from the list of matching wagering game machines. Additionally, the player may be able to specify an alert mechanism (e.g. illuminating a light, etc.) for the wagering game machine to present. In some embodiments, there may be a default time-out period. For example, a player may select a desired wagering game machine, and instruct the wagering game machine to emit a blue light. The wagering game machine may then emit the blue light for a predetermined period of time (e.g. 15 minutes), allowing the player to locate and reach the wagering game machine, without the light remaining permanently illuminated. In some embodiments, the terminal or handheld computing device may provide the user with a unique identification number (a few to several characters) that the player can input on the wagering game machine once they have reached the wagering game machine. Again, this may prevent the wagering game machine from alerting indefinitely, and may also ensure that the correct player has reached the wagering game machine.

Additionally, in some embodiments, the terminal or handheld computing device can provide a player with an exhaustive list of wagering game characteristics available on wagering game machines within the casino or other establishment. Such a list may allow a player to become informed of all options from which they can choose when setting their preferences.

Figure 3:
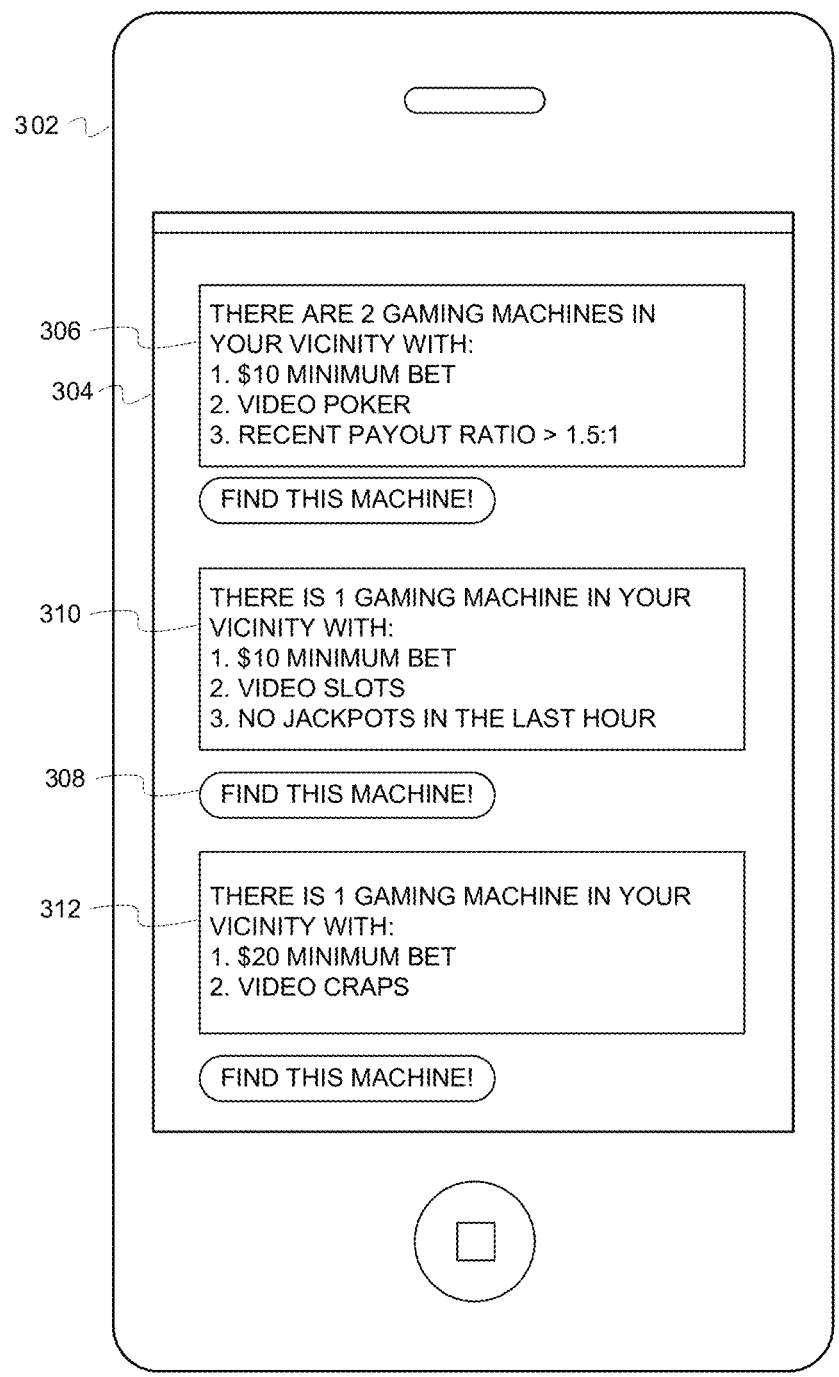
FIG. 3 is a diagrammatic illustration of one embodiment of a handheld computing device 302 displaying proximity alert messages 306.

FIG. 3 is a diagrammatic illustration of one embodiment of a handheld computing device 302 displaying proximity alert messages 306, 310, and 312. The handheld computing device 302 includes a display 304. The handheld computing device 302 presents alert messages 306, 310, and 312 to the user on the display 304. As depicted in FIG. 3, the handheld computing device 302 is presenting three alert messages 306, 310, and 312 to the user. The first alert message 306 is informing the player that there are two wagering game machines in the player's vicinity having a ten dollar minimum bet, video poker, and a recent payout ratio greater than 1.5:1. The second alert message 310 is informing the player that there is one wagering game machine in the player's vicinity having a ten dollar minimum bet, video slots, and no jackpots in the last hour. The third alert message 312 is informing the player that there is one wagering game machine in the player's vicinity having a twenty dollar minimum bet and video craps. In some embodiments, the display 304 may comprise a graphical user interface (GUI) with which the user may interact. For example, in FIG. 3 the handheld computing device 302 has presented soft buttons 308 that enable a player to request further information about the wagering game machine's location. In such embodiments, selecting the soft button 308 can present the player with information pertaining to the wagering game machine's location. For example, the handheld computing device 302 may present a grid display indicating the location of the wagering game machine. In other embodiments, the handheld computing device may present directions for a possible route between the location of the handheld computing device and the wagering game machine, the identification of the bank in which the desired wagering game machine is located, etc.

Operations for Proximity Alerts for Wagering Game Machines

This section describes operations associated with some embodiments of the invention. In the discussion below, the flow diagrams will be described with reference to the block diagrams presented below. However, in some embodiments, the operations can be performed by logic not described in the block diagrams.

In certain embodiments, the operations can be performed by executing instructions residing on machine-readable media, while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
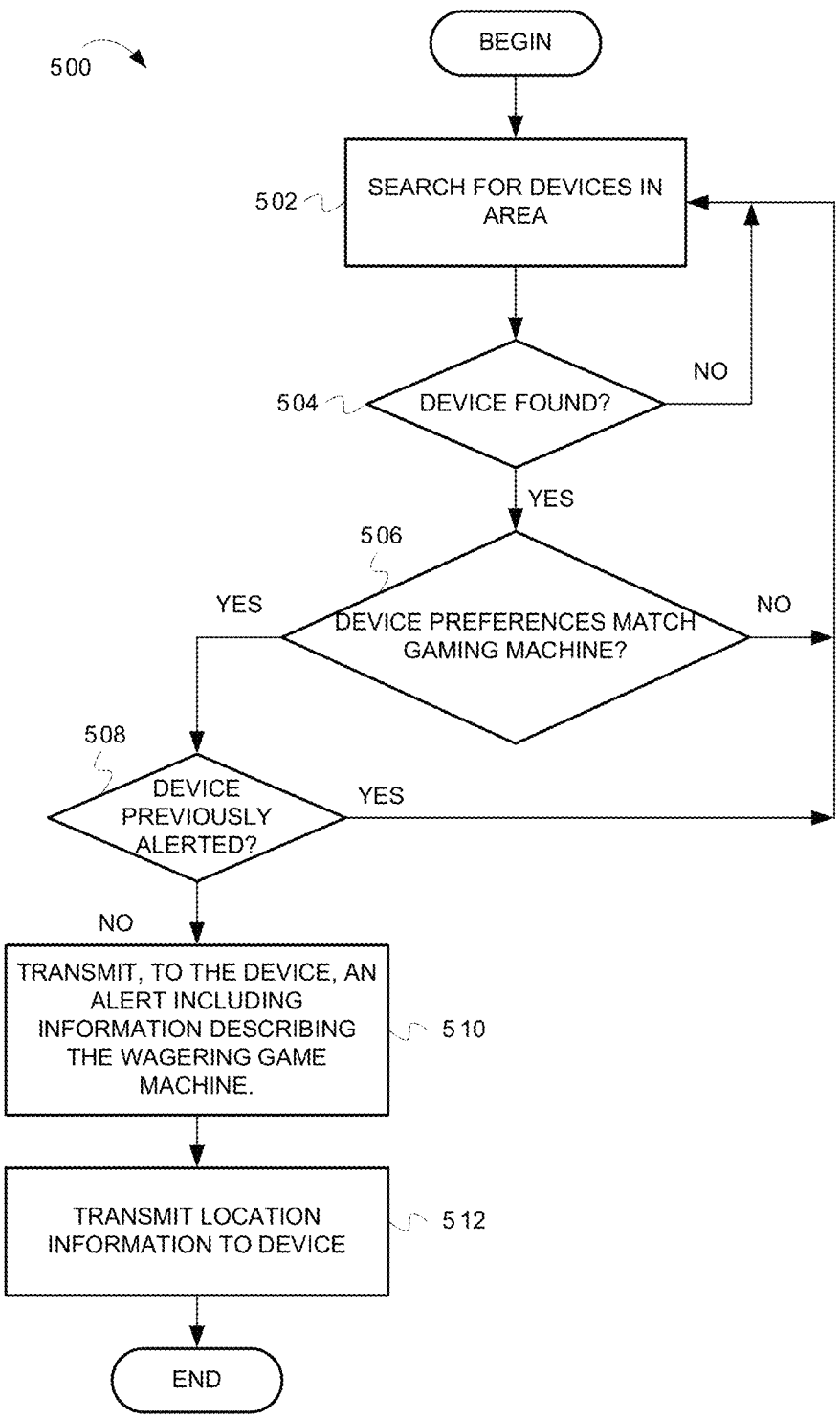
FIG. 5 is a flow diagram illustrating operations for a wagering game machine to provide proximity alerts to a handheld computing device, according to some embodiments of the inventive subject matter.
Figure 6:
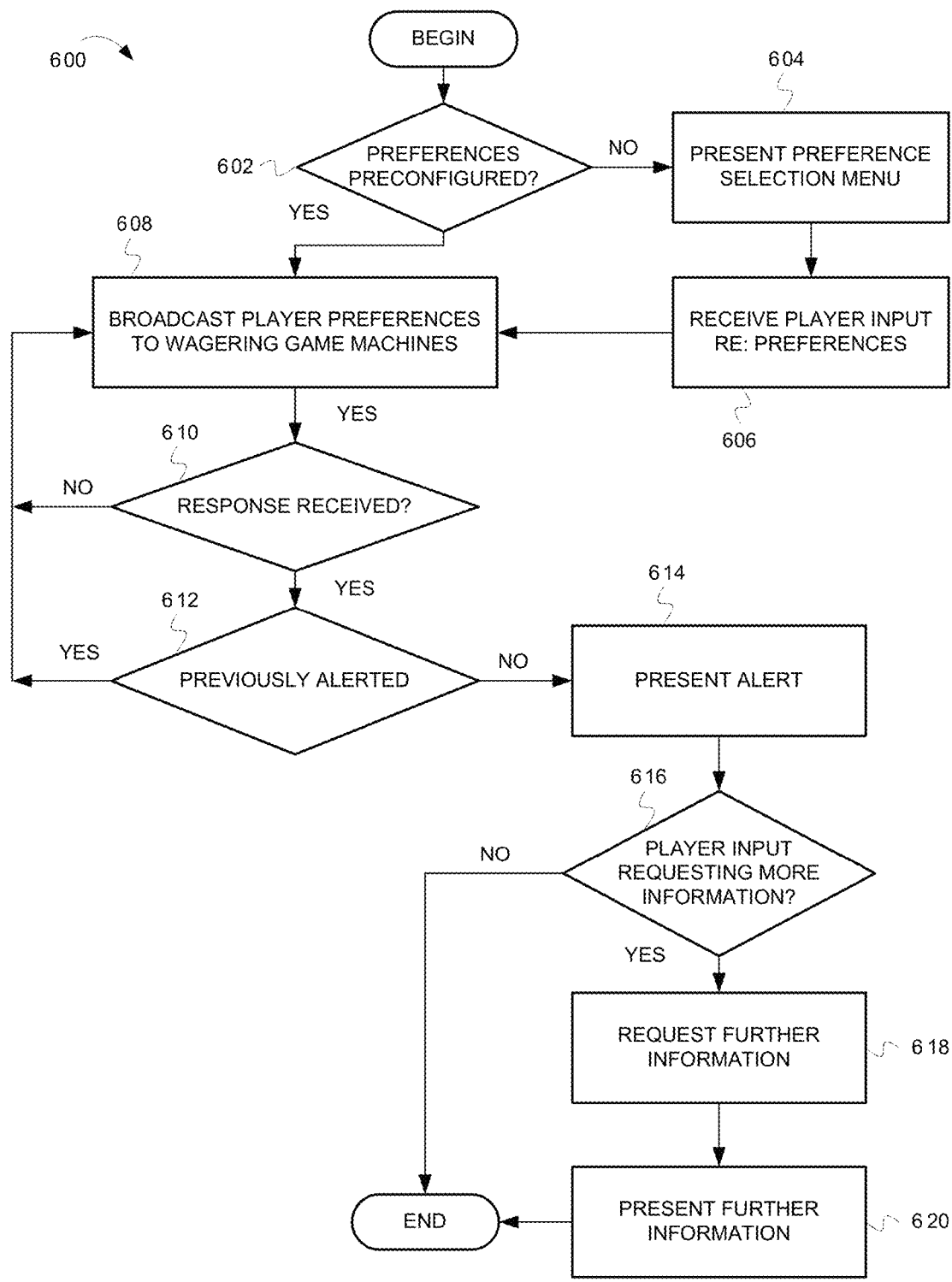
FIG. 6 is a flow diagram illustrating operations for a handheld computing device to provide proximity alerts to a player, according to some embodiments of the inventive subject matter.
Figure 7:
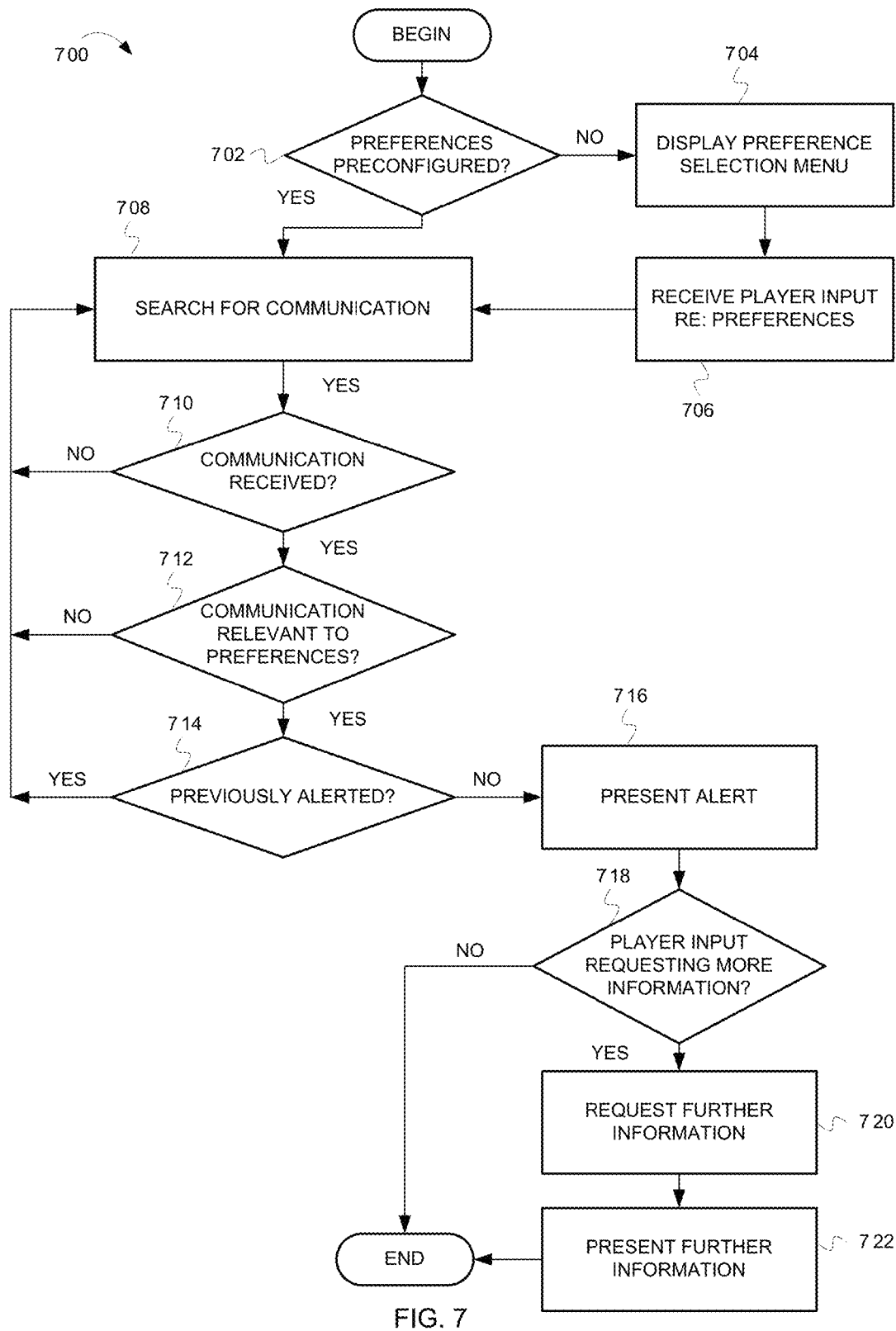
FIG. 7 is a flow diagram illustrating operations for a handheld computing device to provide proximity alerts to a player, according to some embodiments of the inventive subject matter.

This section will discuss FIGS. 4-8. The discussion of FIGS. 4, 6, and 8 will describe operations where the wagering game machine characteristics and user preferences are analyzed either by the wagering game machine or the handheld computing device itself, or by an external backend system. The discussion of FIG. 5 will describe operations where the wagering game machine analyzes the wagering game machine's characteristics and the player's preferences. FIG. 7 will describe operations where the handheld computing device analyzes the wagering game machines characteristics and the player's preferences.

Figure 4:
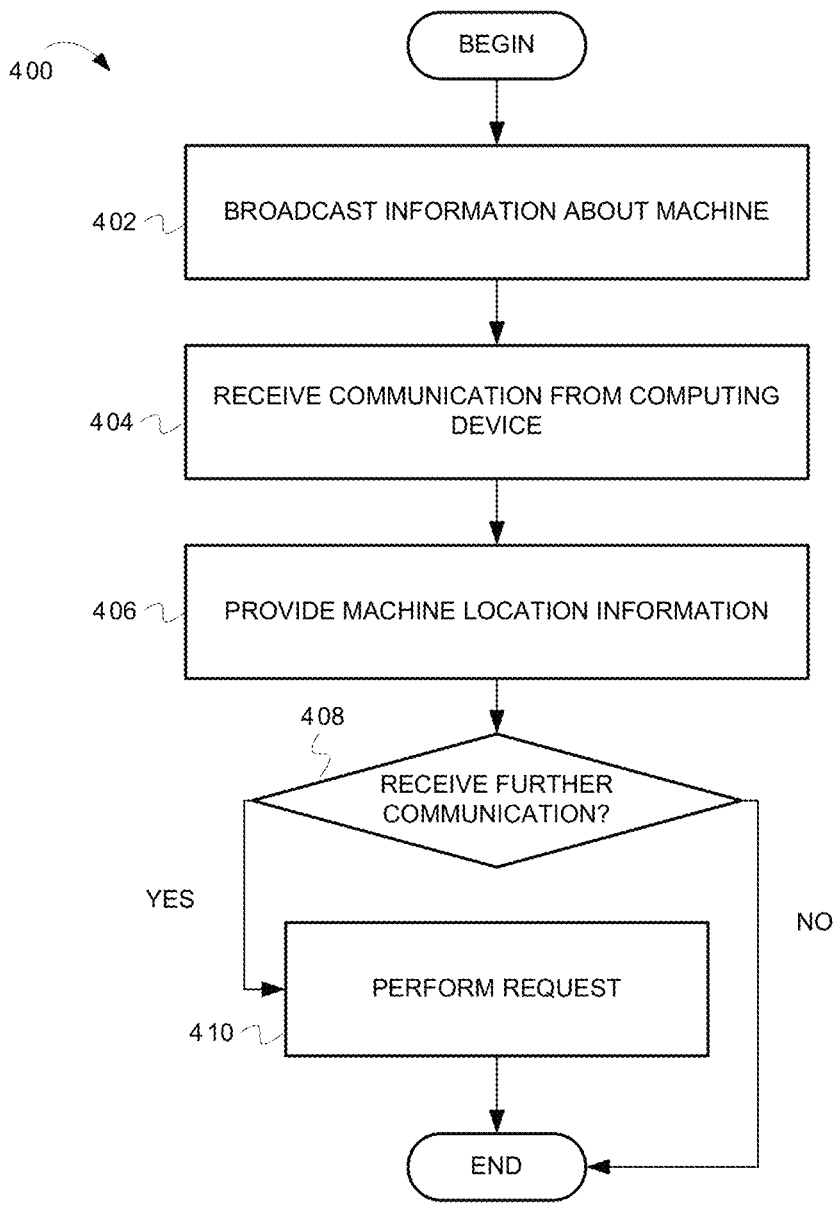
FIG. 4 is a flow diagram illustrating operations for a wagering game machine to transmit wagering game machine characteristics to nearby handheld computing devices, according to some embodiments of the inventive subject matter.

In some embodiments, wagering game machines broadcast their characteristics without much interaction with handheld computing devices (e.g., see FIG. 1). However, in other embodiments, the wagering game machines can be more interactive with handheld computing devices. FIG. 4 is a flow diagram illustrating operations for a wagering game machine to transmit wagering game machine characteristics to nearby handheld computing devices, according to some embodiments of the inventive subject matter. The flow begins at block 402.

At block 402, the wagering game machine broadcasts information about the wagering game machine. Such information may include the games available on the wagering game machine, the denomination of the wagering game machine, the payout ratio of the wagering game machine, etc. The wagering game machine may broadcast this information over a near field communication network, a local area network (LAN), a wide area network (WAN), a cellular network, a Bluetooth network, etc., or any other suitable communication medium. Handheld computing devices (e.g., mobile phones) can receive and process the information. The flow continues at block 404.

As noted, handheld computing devices can receive the wagering game machine's broadcasts. Those handheld computing devices may respond. At block 404, the wagering game machine receives communications from a handheld computing device. Such communications may include a request for the wagering game machine's location. The communications may include the player's preferences or an indication that there is a match between the player's preferences and the wagering game machine's characteristics. Furthermore, the communication may include location information pertaining to the handheld computing device's location. The flow continues at block 406.

At block 406, the wagering game machine provides information to the handheld computing device pertaining to the wagering game machine's location. In some embodiments, the information may indicate that the handheld computing device is within a threshold distance from the wagering game machine. In other embodiments, the wagering game machine may provide more detailed information. For example, the wagering game machine may indicate the approximate distance between the handheld computing device and the wagering game machine. Alternatively, the wagering game machine may indicate a general direction in which the wagering game machine is located with respect to the handheld computing device. Alternatively, the wagering game machine may provide directions for a possible route between the location of the handheld computing device and the wagering game machine. The flow continues at block 408.

At block 408, the wagering game machine may receive further communication from the handheld computing device. In some embodiments, the handheld computing device may request additional or more specific location information from the wagering game machine. Alternatively, the handheld computing device may request that the wagering game machine present media identifying itself. The flow continues at block 410. If the wagering game machine does not receive further communication from the handheld computing device, the flow ends.

At block 410, the wagering game machine responds to the handheld computing device's request. For example, the wagering game machine may illuminate a light or emit a sound to aid the player in locating the wagering game machine. In some embodiments, the wagering game machine can illuminate a canopy extending from, or extending over, the wagering game machine. In some embodiments, the floor, a carpet, or other floor covering may illuminate. From block 410, the flow ends.

As described above, FIG. 4 depicts embodiments where the wagering game machine broadcasts information pertaining to the characteristics of the wagering game machine. In turn, a handheld computing device may receive the broadcast. The handheld computing device may then further communicate with the wagering game machine if the handheld computing device determines that there is a match between the player's preferences and the wagering game machine's characteristics. In contrast, FIG. 5 depicts another embodiment where the wagering game machine takes a more active role. In FIG. 5, the wagering game machine compares the player's preferences to the characteristics of the wagering game machine to determine if there is a match. The operations of FIG. 5 are described below.

FIG. 5 is a flow diagram illustrating operations for a wagering game machine to provide proximity alerts to a handheld computing device. The flow beings at block 502.

At block 502, the wagering game machine searches for handheld computing devices in the area. In some embodiments, the wagering game machine monitors one or more network interfaces for communications from mobile devices. For example, the wagering game machine can monitor a Bluetooth interface for communications from nearby handheld computing devices. Although this example mentions Bluetooth, embodiments can operate with any suitable communication protocol. The flow continues at block 504.

At block 504, the wagering game machine detects a handheld computing device and determines player preferences. For example, the wagering game machine receives Bluetooth communications from a handheld computing device, where the communications indicate a player's preferences. The flow continues at block 506. If no handheld computing devices are detecting, the flow continues at block 502.

At block 506, the wagering game machine determines whether a match exists between the player's preferences and the wagering game machine's characteristics. For example, the wagering game machine may offer certain types of games or certain denominations that match the player's preferences. If there is a match, the flow continues at block 508. Otherwise the flow continues at 502.

At block 508, the wagering game machine determines if the device has been previously alerted of the machine's presence. That is, before sending an alert to a handheld computing device, the machine determines whether it has already notified the handheld computing device of its presence and characteristics. The wagering game machine makes this determination to reduce resource consumption related to alerts (e.g., network traffic and information processing). In some embodiments, the wagering game machine may alert the handheld computing device again if the handheld computing device left the vicinity of the wagering game machine since the last alert. Alternatively, a time period may be established in which the wagering game machine will not alert the same device twice within the time period. For example, a wagering game machine may only alert a handheld computing device once every hour while the handheld computing device remains in the vicinity of the wagering game machine. The flow continues at block 510. If the handheld computing device has previously been alerted, the flow continues at block 502.

At block 510, the wagering game machine transmits an alert to the handheld computing device indicating that there is a match between the player's preferences and the wagering game machine's characteristics. Additionally, in some embodiments, the wagering game machine may transmit information to the handheld computing device pertaining to the wagering game machine's characteristics. The flow continues at block 512.

In some embodiments, at block 512, the wagering game machine may transmit location information to the handheld computing device. In such embodiments, the location information may include the coordinates of the wagering game machine on a predetermined grid, the direction of the wagering game machine from the handheld computing device, directions for a possible route between the handheld computing device and the wagering game machine, etc. From block 512, the flow ends.

As discussed above, FIG. 5 depicts embodiments where the wagering game machine searches for handheld computing devices, then determines whether a match exists between the player's preferences and the wagering game machine's characteristics. In contrast, FIG. 6 depicts another embodiment where the handheld computing device broadcasts the player's preferences. In turn, the wagering game machine determines whether a match exists between the player's preferences and the wagering game machine's characteristics. If a match exists, the wagering game machine informs the handheld computing device of the match. The operations are described in more detail below.

FIG. 6 is a flow diagram illustrating operations for a handheld computing device to provide proximity alerts to a player. The flow begins at block 602.

At block 602 the handheld computing device determines if the player's preferences have been previously configured. If the player's preferences have not been previously configured, the flow continues at block 604. If the player's preferences have been previously configured, the flow continues at block 608.

At block 604, the handheld computing device presents the preference selection menu. (See FIG. 2 and discussion of FIG. 2 for an example embodiment). The flow continues at block 606.

At block 606, the handheld computing device receives player input indicating the player's preferences. (See FIG. 2 and discussion of FIG. 2 for an example embodiment). The flow continues at block 608.

At block 608, the handheld computing device broadcasts the player's preferences. The handheld computing device may broadcast the player's preferences over a near field communication (NFC) network, a local area network (LAN), a wide area network (WAN), a cellular network, a Bluetooth network, etc., or any other suitable communication medium. Wagering game machines and/or backend systems can receive and process the communication including the player's preferences. The flow continues at block 610.

As noted, wagering game machines and/or backend systems can receive the handheld computing device's broadcasts. These wagering game machines and backend systems can respond. At block 610, the handheld computing device receives a response indicating a match between the wagering game machine's characteristics and the player's preferences. In some embodiments, the wagering game machine may determine whether a match exists. In other embodiments, as discussed in FIG. 1, an external or backend system may determine whether a match exists. The flow continues at block 612. If the handheld computing device does not receive a response indicating a match between the wagering game machine's characteristics and the player's preferences, the flow continues at block 608.

At block 612, if the player has not been previously alerted, the handheld computing device presents an alert. In some embodiments, this determination may be made by the handheld computing device or the wagering game machine. In other embodiments, an external or backend system may make this determination. As discussed in FIG. 5, in some embodiments, there may be a threshold timespan, or geographical component, to determine whether to alert the player again. The flow continues at block 614. If the player has been previously alerted, the flow continues at block 608.

At block 614, the handheld computing device presents an alert to the player. In some embodiments, the alert may comprise an indication that the handheld computing device is within the proximity of the wagering game machine. In other embodiments, the alert may comprise additional information, including the characteristics of the wagering game machine, etc. The handheld computing device may alert the player by auditory, visual, mechanical, or any other suitable means. In some embodiments, the player may be able to set a preferred alert method. The flow continues at block 616.

In some embodiments, at block 616, the handheld computing device may request further information from the gaming machine or backend system. In some embodiments, the handheld computing device may request additional or more specific location information from the wagering game machine or backend system. Alternatively, the handheld computing device may request that the wagering game machine present media identifying itself. The flow continues at block 618. If the handheld computing device does not request further information, the flow ends.

At block 618, the handheld computing device requests further information. The flow continues at block 620.

At block 620, the handheld computing device presents the further information. For example, the handheld computing device might present more detailed or more specific location information. Alternatively, the wagering game machine may illuminate a light or emit a sound to aid the player in locating the wagering game machine. In some embodiments, the wagering game machine can illuminate a canopy extending from, or extending over, the wagering game machine. In some embodiments, the floor, a carpet, or other floor covering may illuminate. In some embodiments, the handheld computing device may inform the player that such action is being performed by the wagering game machine. From block 620, the flow ends.

As described above, FIG. 6 depicts one embodiment of the inventive subject matter, where the handheld computing device broadcasts the player's preferences, and the wagering game machine determines if there is a match between the player's preferences and the wagering game machine's characteristics. In contrast, FIG. 7 depicts another embodiment of the inventive subject matter, where the handheld computing device searches for communication from wagering game machines. Upon receiving a communication from a wagering game machine, the handheld computing device compares the player's preferences with the wagering game machine's characteristics.

FIG. 7 is a flow diagram illustrating operations for a handheld computing device to provide proximity alerts to a player. The flow begins at block 702.

At block 702 the handheld computing device determines if the player's preference have been previously configured. If the player's preferences have not previously been configured, the flow continues at block 704. If the player's preferences have been previously configured, the flow continues at block 708.

At block 704, the handheld computing device presents the preference selection menu. (See FIG. 2 and discussion of FIG. 2 for an example embodiment). The flow continues at block 706.

At block 706, the handheld computing device receives player input indicating the player's preferences. (See FIG. 2 and discussion of FIG. 2 for an example embodiment). The flow continues at block 708.

At block 708, the handheld computing device searches for communication. In some embodiments, the handheld computing device monitors one or more network interfaces for communications from wagering game machines. For example, the handheld computing device can monitor a Bluetooth interface for communications from nearby wagering game machines. Although this example mentions Bluetooth, embodiments can operate with any suitable communication protocol. In other embodiments, the handheld computing device may search for communication from a backend system. The flow continues at block 710.

At block 710, the handheld computing device receives communication from a wagering game machine or a backend system. For example, the handheld computing device receives Bluetooth communications from a wagering game machine where the communications indicate the wagering game machine's characteristics. As another example, the handheld computing device receives WiFi communication from a back end system, where the communications indicate characteristics of a nearby wagering game machine. The flow continues at block 712. If no communication is received, the flow continues at block 708.

At block 712, the handheld computing device determines if the communication received is relevant to the player's preferences. In some embodiments, the communication may be relevant if the characteristics of the wagering game machine are similar to the player's preferences. The flow continues at block 714. If the communication received is not relevant to the player's preferences, the flow continues at block 708.

At block 714, the handheld computing device determines if the player has been previously alerted of the wagering game machine's presence. As discussed in FIG. 5 at block 508, in some embodiments, there may be a threshold timespan, or geographical component, to determine whether to alert the player again. If the player has not been previously alerted, the flow continues at block 716. If the player has been previously alerted, the flow continues at block 708.

At block 716, the handheld computing device presents an alert to the player. In some embodiments, the alert may comprise an indication that the handheld computing device is within the proximity of the wagering game machine. In other embodiments, the alert may comprise additional information, including the characteristics of the wagering game machine, etc. The handheld computing device may alert the player by auditory, visual, mechanical, or any other suitable means. In some embodiments, the player may be able to set a preferred alert method. In some embodiments, the wagering game machine may emit a light, sound, or other media to aid the player in locating the wagering game machine. In some embodiments, the player may be able to select preferences as to the wagering game machine's alert. For example, the player may be able to choose a specific color, symbol, etc. for the wagering game machine to display. The flow continues at block 718.

In some embodiments, at block 718, the handheld computing device may request further information from the gaming machine or backend system. In some embodiments, the handheld computing device may request additional or more specific location information from the wagering game machine or backend system. Alternatively, the handheld computing device may request that the wagering game machine present media identifying itself. The flow continues at block 720. If the handheld computing device does not request further information, the flow ends.

At block 720, the handheld computing device requests further information. The flow continues at block 722.

At block 722, the handheld computing device presents the further information. For example, the handheld computing device might present more detailed or more specific location information. Alternatively, the wagering game machine may illuminate a light or emit a sound to aid the player in locating the wagering game machine. In some embodiments, the wagering game machine can illuminate a canopy extending from, or extending over, the wagering game machine. In some embodiments, the floor, a carpet, or other floor covering may illuminate. In some embodiments, the handheld computing device may inform the player that such action is being performed by the wagering game machine. From block 722, the flow ends.

As described above, FIG. 7 depicts embodiments where the handheld computing device searches for communications and determines whether there is a match between the player's preferences and the wagering game machine's characteristics. In contrast, FIG. 8 depicts another embodiment of the inventive subject matter, where a player's preferences with the wagering game machine's characteristics to determine if there is a match.

Figure 8:
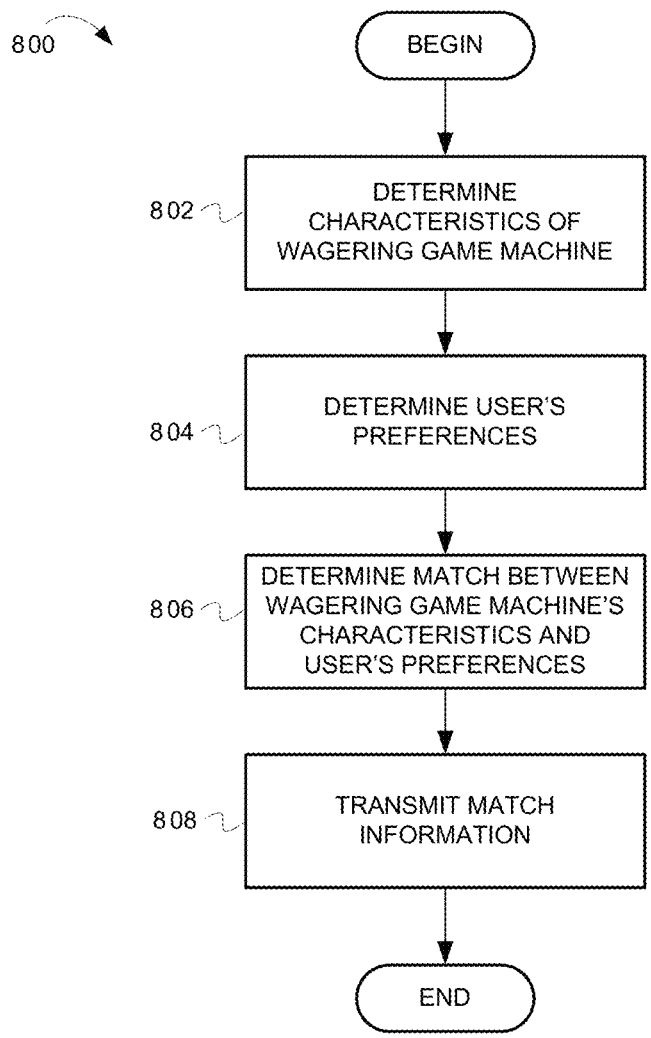
FIG. 8 is a flow diagram illustrating operations for a system to determine a match between a wagering game machine's characteristics and a player's preferences, according to some embodiments of the inventive subject matter.

FIG. 8 is a flow diagram illustrating operations for a system to determine a match between a wagering game machine's characteristics and a player's preferences. The flow begins at block 802.

At block 802, the system determines the characteristics of the wagering game machine. In some embodiments, the wagering game machine itself may determine its own characteristics. In other embodiments, a handheld computing device may determine the characteristics of the wagering game machine. In other embodiments, an external backend system may determine the characteristics of the wagering game machine. The flow continues at block 804.

At block 804, the system determines the player's preferences. In some embodiments, the wagering game machine may determine the player's preferences. In other embodiments, the handheld computing device may determine the player's preferences. In other embodiments, an external backend system may determine the player's preferences. The flow continues at block 806.

At block 806, the system determines a match between the wagering game machine's characteristics and the player's preferences. In some embodiments, the wagering game machine may perform this analysis. In other embodiments, the handheld computing device may perform this analysis. In other embodiments, an external backend system may perform this analysis. The flow continues at block 808.

At block 808, the system transmits the match information. In some embodiments, the wagering game machine may perform this operation. In other embodiments, the handheld computing device may perform this operation. In other embodiments, an external backend system may perform this operation. The match information transmitted may include the location of the wagering game machine, or the direction of the wagering game machine with respect to the handheld computing device. In other embodiments, the match information may include the characteristics of the wagering game machine that correspond to the player's preferences.

Operating Environment

This section describes an example operating environment and presents structural aspects of some embodiments.

Wagering Game Machine Architectures

Figure 9:
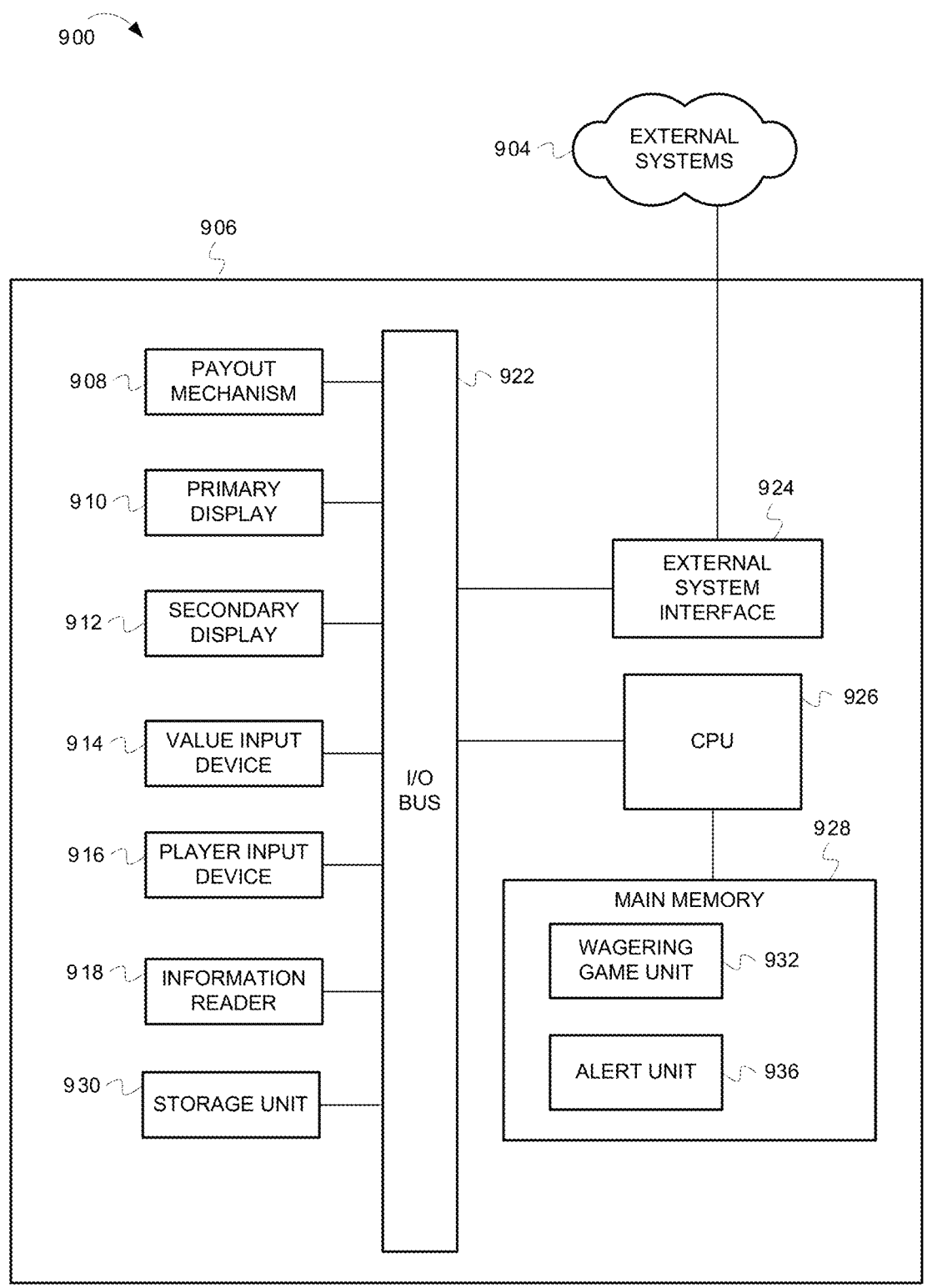
FIG. 9 is a block diagram illustrating a wagering game machine architecture, according to example embodiments of the invention.

FIG. 9 is a block diagram illustrating a wagering game machine architecture, according to example embodiments of the invention. As shown in FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932 and an alert unit 936. In one embodiment, the wagering game unit 932 can present wagering games, such as video poker, video black jack, video slots, video lottery, etc., in whole or part. In some embodiments, the alert unit 936 can perform communication operations between the wagering game machine 900 and the handheld computing device. In some embodiments, the alert unit 936 can determine if there is a match between the player's preferences and the wagering game machine's 900 characteristics. In some embodiments, the alert unit 936 can notify a handheld computing device that a match exists between the player's preferences and the wagering game machine's 900 characteristics. The alert unit 936 can perform any of the operations discussed in FIGS. 4-8.

The CPU 926 is also connected to an input/output (I/O) bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, and storage unit 930. The player input device 916 can include the value input device 914 to the extent the player input device 916 is used to place wagers. The I/O bus 922 is also connected to an external system interface 924, which is connected to external systems 904 (e.g., wagering game networks).

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

Any component of the architecture 900 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 9 describes an example wagering game machine architecture, this section continues with a discussion wagering game networks.

Handheld Computing Device Architecture

Figure 10:
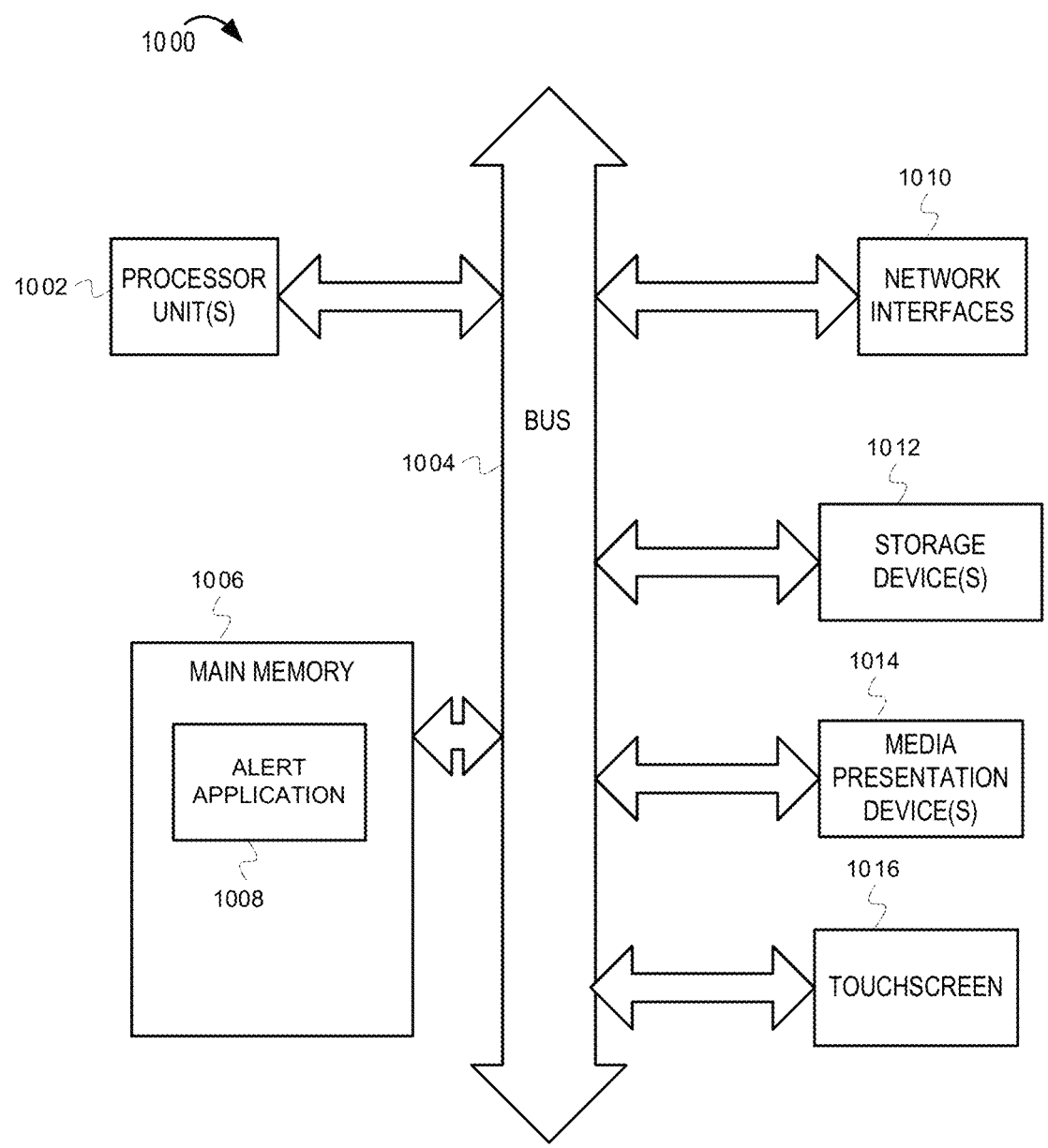
FIG. 10 is a block diagram of an exemplary handheld computing device 1000, according to some embodiments of the inventive subject matter.

FIG. 10 is a block diagram of an exemplary handheld computing device 1000, according to some embodiments of the inventive subject matter. The handheld computing device 1000 includes a processor unit 1002 (possibly including multiple processors, multiple cores, multiple nodes, and/or implementing multi-threading, etc.). The handheld computing device 1000 includes memory 1006. In some embodiments, the main memory 1006 can include an alert application 1008. In some embodiments, the alert application 1008 can perform communication operations between the wagering game machine and the handheld computing device 1000. In some embodiments, the alert application 1008 can determine if there is a match between the player's preferences and the wagering game machine's characteristics. In some embodiments, the alert application 1008 can notify the player that a match exists between the player's preferences and the wagering game machine's characteristics. The alert application 1008 can perform any of the operations discussed in FIGS. 4-8.

The memory 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The handheld computing device 1000 also includes a bus 1004 (e.g., PCI, ISA, PCI-Express, HyperTransport®, InfiniBand®, NuBus, etc.), a network interface 1010 (e.g., an ATM interface, an Ethernet interface, a Frame Relay interface, SONET interface, wireless interface, etc.), and a storage device(s) 1012 (e.g., optical storage, magnetic storage, etc.). The system memory 1006 embodies functionality to implement embodiments described above. The system memory 1006 may include an alert application 1008. Any one of these functionalities may be partially (or entirely) implemented in hardware and/or on the processing unit 1002. For example, the functionality may be implemented with an application specific integrated circuit, in logic implemented in the processing unit 1002, in a co-processor on a peripheral device or card, etc. Further, realizations may include fewer or additional components not illustrated in FIG. 10 (e.g., video cards, audio cards, additional network interfaces, peripheral devices, etc.). The processor unit 1002, the storage device(s) 1012, and the network interface 1010 are coupled to the bus 1004. Although illustrated as being coupled to the bus 1004, the memory 1006 may be coupled to the processor unit 1002.

Wagering Game Networks

Figure 11:
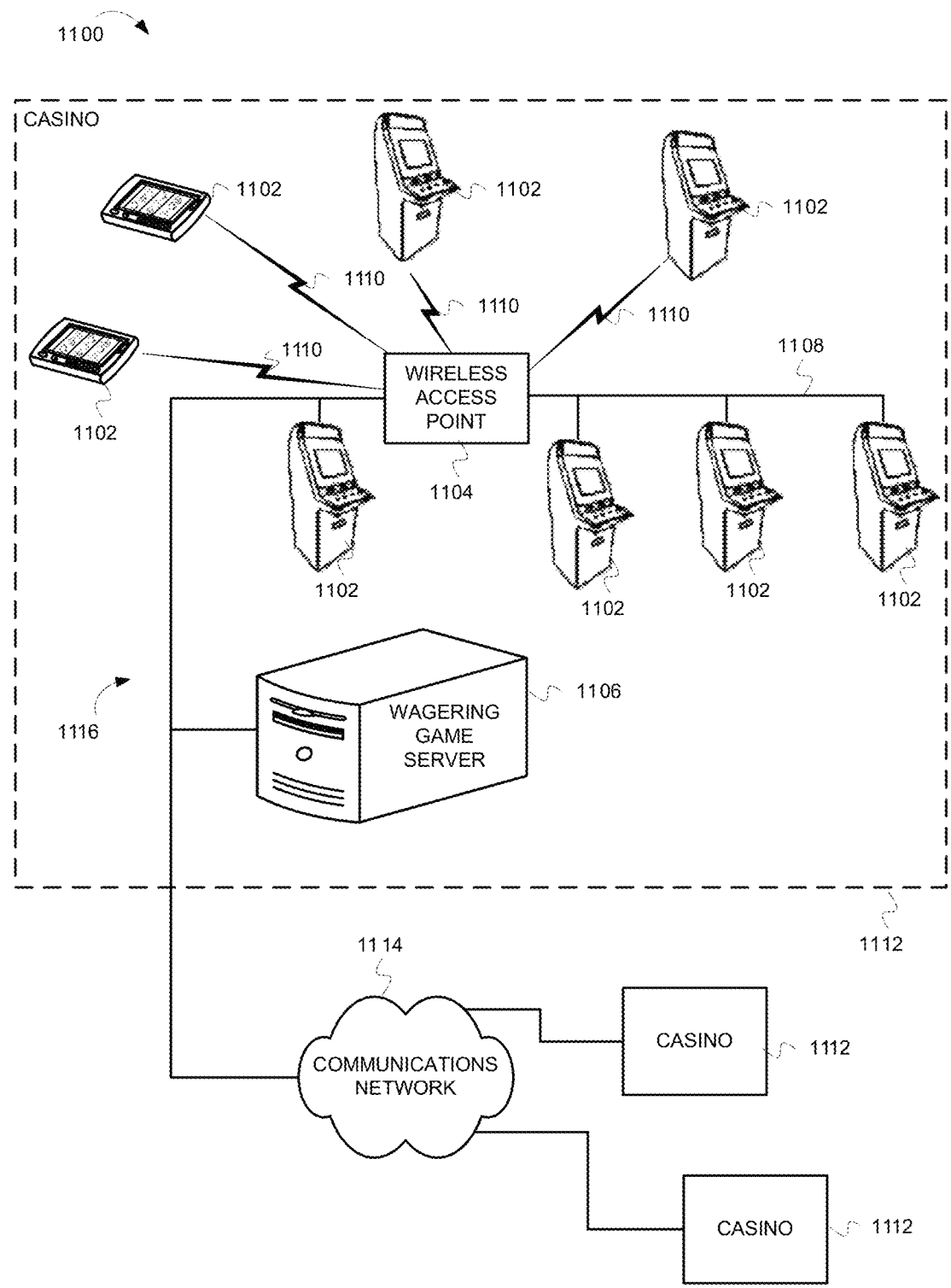
FIG. 11 is a block diagram illustrating a wagering game network 1100, according to example embodiments of the invention.

FIG. 11 is a block diagram illustrating a wagering game network 1100, according to example embodiments of the invention. As shown in FIG. 10, the wagering game network 1100 includes a plurality of casinos 1112 connected to a communications network 1114.

Each casino 1112 includes a local area network 1116, which includes an access point 1104, a wagering game server 1106, and wagering game machines 1102. The access point 1104 provides wireless communication links 1110 and wired communication links 1108. The wired and wireless communication links can employ any suitable connection technology, such as Bluetooth, 802.11, Ethernet, public switched telephone networks, SONET, etc. In some embodiments, the wagering game server 1106 can serve wagering games and distribute content to devices located in other casinos 1112 or at other locations on the communications network 1114.

The wagering game machines 1102 described herein can take any suitable form, such as floor standing models, handheld mobile units, bartop models, workstation-type console models, etc. Further, the wagering game machines 1102 can be primarily dedicated for use in conducting wagering games, or can include non-dedicated devices, such as mobile phones, personal digital assistants, personal computers, etc. In one embodiment, the wagering game network 1100 can include other network devices, such as accounting servers, wide area progressive servers, player tracking servers, and/or other devices suitable for use in connection with embodiments of the invention.

In some embodiments, wagering game machines 1102 and wagering game servers 1106 work together such that a wagering game machine 1102 can be operated as a thin, thick, or intermediate client. For example, one or more elements of game play may be controlled by the wagering game machine 1002 (client) or the wagering game server 1106 (server). Game play elements can include executable game code, lookup tables, configuration files, game outcome, audio or visual representations of the game, game assets or the like. In a thin-client example, the wagering game server 1106 can perform functions such as determining game outcome or managing assets, while the wagering game machine 1102 can present a graphical representation of such outcome or asset modification to the player (e.g., player). In a thick-client example, the wagering game machines 1102 can determine game outcomes and communicate the outcomes to the wagering game server 1106 for recording or managing a player's account.

In some embodiments, either the wagering game machines 1102 (client) or the wagering game server 1106 can provide functionality that is not directly related to game play. For example, account transactions and account rules may be managed centrally (e.g., by the wagering game server 1106) or locally (e.g., by the wagering game machine 1102). Other functionality not directly related to game play may include power management, presentation of advertising, software or firmware updates, system quality or security checks, etc.

In some embodiments, the wagering game machines 1102 can communicate with handheld computing devices. In some embodiments, the wagering game machines 1102 can determine if a match exists between the wagering game machine's characteristics and the player's preferences. In some embodiments, the wager game machines 1102 can notify handheld computing devices that a match exists between the wagering game machine's characteristics and the player's preferences.

In some embodiments, a handheld computing device can determine if a match exists between the wagering game machine's characteristics and the player's preferences. In some embodiments, a handheld computing device can notify wagering game machines 1102 that a match exists between the wagering game machine's characteristics and the player's preferences.

In some embodiments, the wagering game server 1106 can communicate with the wagering game machines 1102 and the handheld computing devices. In some embodiments, the wagering game server can determine whether a match exists between the wagering game machine's characteristics and the player's preferences. In some embodiments, the wagering game server 1108 can notify the wagering game machines 1102 and/or the handheld computing devices that a match exists between the wagering game machine's characteristics and the player's preferences.

Any of the wagering game network components (e.g., the wagering game machines 1102) can utilize any combination of hardware and one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Example Wagering Game Machines

Figure 12:
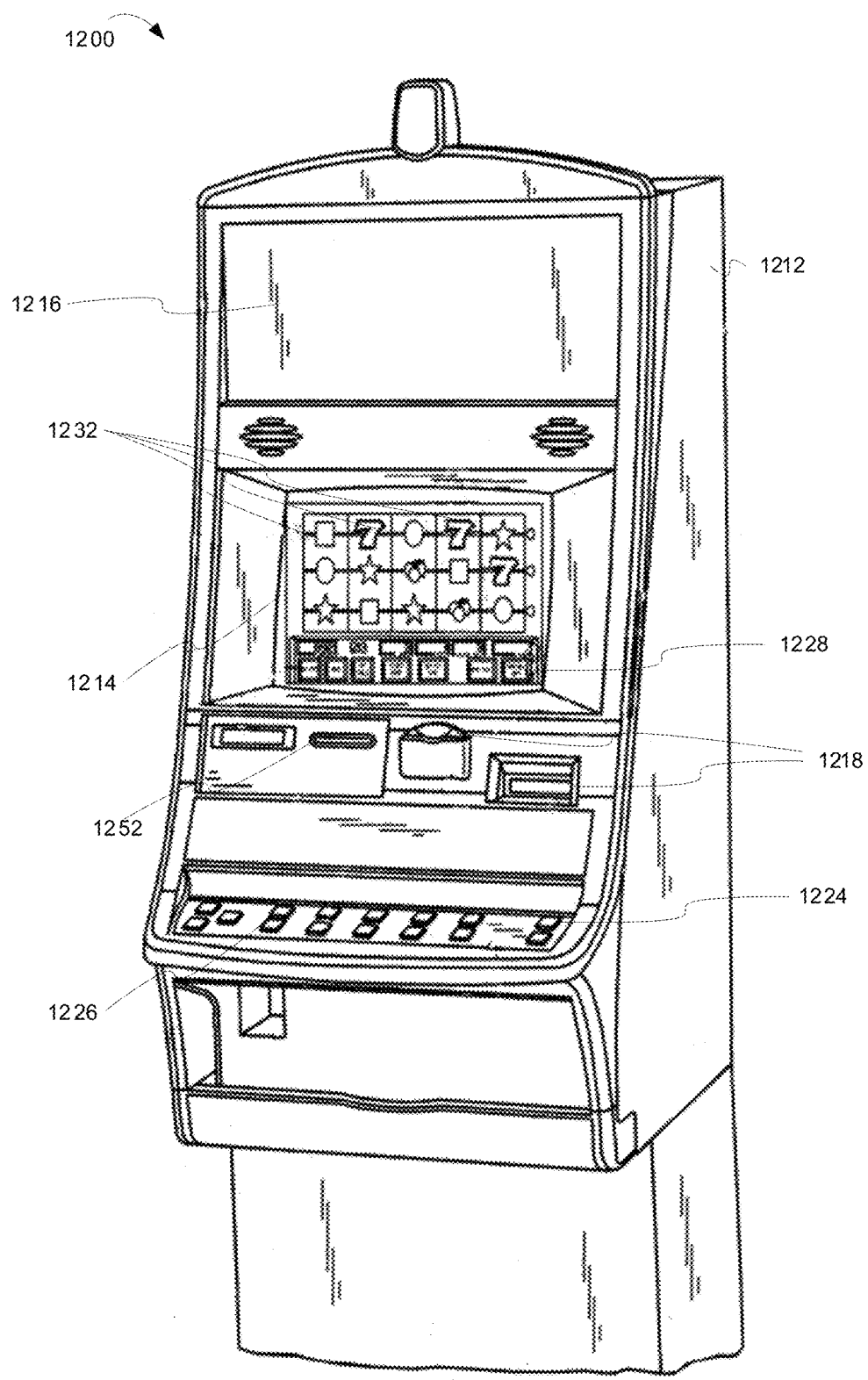
FIG. 12 is a perspective view of a wagering game machine, according to example embodiments of the invention.

FIG. 12 is a perspective view of a wagering game machine, according to example embodiments of the invention. In some embodiments, the wagering game machine 1200 can perform any of the operations described above for alerting handheld computing devices, etc. of a match between the wagering game machine's 1200 characteristics and the player's preferences. Referring to FIG. 12, a wagering game machine 1200 is used in gaming establishments, such as casinos. According to embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1128 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bartop model, mobile handheld model, or workstation console model.

A player begins playing a basic wagering game by making a wager via the value input device 1218. The player can initiate play by using the player input device's buttons or touch screen 1228. The basic game can include arranging a plurality of symbols along a payline 1232, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface.

In some embodiments, the information reader 1252 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for a handheld device to automatically locate wagering game machines that match player preferences, the method comprising:
   receiving, by the handheld device via a player input device, a player preference;
   broadcasting, by the handheld device over a wireless network to wagering game machines in proximity to the handheld device, wireless communications indicating the player preference;
   receiving, by each wagering game machine in proximity to the handheld device, the wireless communications;
   for each wagering game machine that receives the wireless communications,
      determining if the player preference matches any characteristic of the wagering game machine;
      upon determining the player preference matches any characteristic of the wagering game machine,
         transmitting, to the handheld device over the wireless network,
            information describing the wagering game machine, and information indicating a location of the wagering game machine relative to the handheld device;
   detecting, via one or more electronic input devices of one of the wagering game machines, a physical item associated with a monetary value that establishes a credit balance;
   initiating, by the one of the wagering game machines, a casino wagering game in response to an input indicative of a wager covered by the credit balance;
   receiving, via at least one of the one or more electronic input devices, a cashout input that initiates a payout from the credit balance.

2. The method of claim 1, wherein the player preference indicates one or more of a game type, a currency denomination, a maximum wager, a minimum wager, or a game theme.

3. The method of claim 1, wherein any characteristic of the wagering game machine includes at least one of currency denomination, wager maximum, wager minimum, or wagering game machine type.

4. The method of claim 1, further comprising:
   causing the handheld device to present, on a media device, the information describing the wagering game machine.

5. The method of claim 4, wherein the causing includes presentation of at least one of an audible alert, a visual alert, or a tactile alert.

6. The method of claim 1, further comprising:
   receiving, by the handled device from the wagering game machine, location information indicating a location of the wagering game machine.

7. A non-transitory computer readable medium including instructions to automatically locate wagering game machines that match player preferences, the instructions executable by one or more processors, the instructions comprising:
   instructions to receive, by a handheld device via a player input device, a player preference;
   instructions to broadcast, by the handheld device over a wireless network to wagering game machines in proximity to the handheld device, wireless communications indicating the player preference;
   instructions to receive, by each wagering game machine in proximity to the handheld device, the wireless communications;
   for each wagering game machine that receives the wireless communications,
      instructions to determine if the player preference matches any characteristic of the wagering game machine;
      instructions to upon determination that the player preference matches any characteristic of the wagering game machine, transmit, to the handheld device over the wireless network, information describing the wagering game machine, and information indicating a location of the wagering game machine relative to the handheld device;
   instructions to detect, via one or more electronic input devices of one of the wagering game machines, a physical item associated with a monetary value that establishes a credit balance;
   instructions to initiate, by the one of the wagering game machines, a casino wagering game in response to an input indicative of a wager covered by the credit balance;
   instructions to receive, via at least one of the one or more electronic input devices, a cashout input that initiates a payout from the credit balance.

8. The computer readable medium of claim 7, wherein the player preference indicates one or more of a game type, a currency denomination, a maximum wager, a minimum wager, or a game theme.

9. The computer readable medium of claim 7, wherein any characteristic of the wagering game machine includes at least one of currency denomination, wager maximum, wager minimum, or wagering game machine type.

10. The computer readable medium of claim 7, the instructions further comprising: instructions to cause the handheld device to present, on a media device, the information describing the wagering game machine.

11. The computer readable medium of claim 10, wherein the instructions to cause include instructions to present at least one of an audible alert, a visual alert, or a tactile alert.

12. The computer readable medium of claim 7, the instructions further comprising:
  instructions to receive, by the handled device from the wagering game machine, location information indicating a location of the wagering game machine.

13. An apparatus comprising:
  one or more processors;
  one or more non-transitory computer readable mediums including instructions to automatically locate wagering game machines that match player preferences, the instructions executable by the one or more processors, the instructions comprising:
    instructions to receive, by a handheld device via a player input device, a player preference;
    instructions to broadcast, by the handheld device over a wireless network to wagering game machines in proximity to the handheld device, wireless communications indicating the player preference;
    instructions to receive, by each wagering game machine in proximity to the handheld device, the wireless communications;
      for each wagering game machine that receives the wireless communications,
        instructions to determine if the player preference matches any characteristic of the wagering game machine;
        instructions to upon determination that the player preference matches any characteristic of the wagering game machine, transmit, to the handheld device over the wireless network, information describing the wagering game machine, and information indicating a location of the wagering game machine relative to the handheld device;
    instructions to detect, via one or more electronic input devices of one of the wagering game machines, a physical item associated with a monetary value that establishes a credit balance;
    instructions to initiate, by the one of the wagering game machines, a casino wagering game in response to an input indicative of a wager covered by the credit balance;
    instructions to receive, via at least one of the one or more electronic input devices, a cashout input that initiates a payout from the credit balance.

14. The apparatus of claim 13, wherein the player preference indicates one or more of a game type, a currency denomination, a maximum wager, a minimum wager, or a game theme.

15. The apparatus of claim 13, wherein any characteristic of the wagering game machine includes at least one of currency denomination, wager maximum, wager minimum, or wagering game machine type.

16. The apparatus of claim 13, the instructions further comprising:
  instructions to cause the handheld device to present, on a media device, the information describing the wagering game machine.

17. The apparatus of claim 16, wherein the instructions to cause include instructions to present at least one of an audible alert, a visual alert, or a tactile alert.

18. The apparatus of claim 13, the instructions further comprising:
  instructions to receive, by the handled device from the wagering game machine, location information indicating a location of the wagering game machine.

* * * * *